US012608576B1

(12) United States Patent
Diorio et al.

(10) Patent No.: US 12,608,576 B1
(45) Date of Patent: Apr. 21, 2026

(54) RFID TAGS INDICATING AVAILABILITY OF ADDITIONAL DATA TO BE READ

(71) Applicant: Impinj, Inc., Seattle, WA (US)

(72) Inventors: Christopher J. Diorio, Shoreline, WA (US); Megan Marie Brewster, Seattle, WA (US); Rene Dominic Martinez, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

(21) Appl. No.: 18/894,442

(22) Filed: Sep. 24, 2024

Related U.S. Application Data

(60) Provisional application No. 63/586,569, filed on Sep. 29, 2023.

(51) Int. Cl.
*G06K 19/07* (2006.01)
*G06K 7/10* (2006.01)

(52) U.S. Cl.
CPC ....... *G06K 19/072* (2013.01); *G06K 7/10297* (2013.01)

(58) Field of Classification Search
CPC .......................... G06K 19/072; G06K 7/10297

USPC .......................................................... 235/451
See application file for complete search history.

(56) References Cited

U.S. PATENT DOCUMENTS

| | | | |
|---|---|---|---|
| 11,797,813 B1 * | 10/2023 | Ensworth ........... | G06K 19/0723 |
| 2009/0153308 A1 * | 6/2009 | Park ..................... | G06Q 20/341 |
| | | | 711/170 |
| 2011/0163856 A1 * | 7/2011 | Weidinger ......... | G06K 19/0723 |
| | | | 340/10.41 |
| 2012/0112889 A1 * | 5/2012 | Mo .......................... | H04B 5/20 |
| | | | 340/10.1 |
| 2021/0350197 A1 * | 11/2021 | Chow ................ | G06Q 20/3829 |

* cited by examiner

*Primary Examiner* — Ahshik Kim
(74) *Attorney, Agent, or Firm* — Turk IP Law, LLC

(57) ABSTRACT

Communications between RFID tags and RFID readers often involve the RFID reader retrieving data from a memory bank of the RFID tag by transmitting a wireless command. The RFID tag can respond to the wireless command by first accessing its memory bank to determine if at least a portion of the requested data is available and if additional data are also available in the memory bank. If additional data are also available, the RFID tag responds to the wireless command by transmitting the requested data combined with an indication of an available amount of the additional data.

20 Claims, 9 Drawing Sheets

100
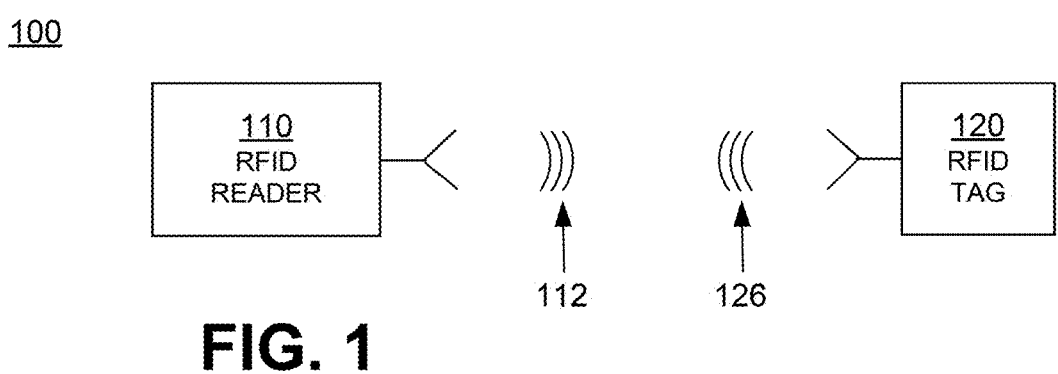
FIG. 1
200
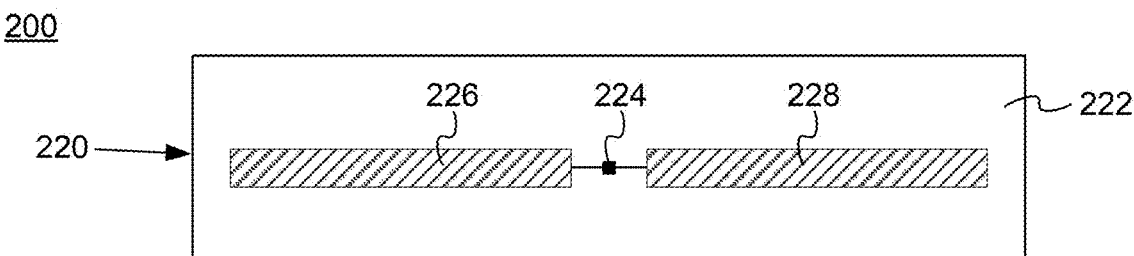
250
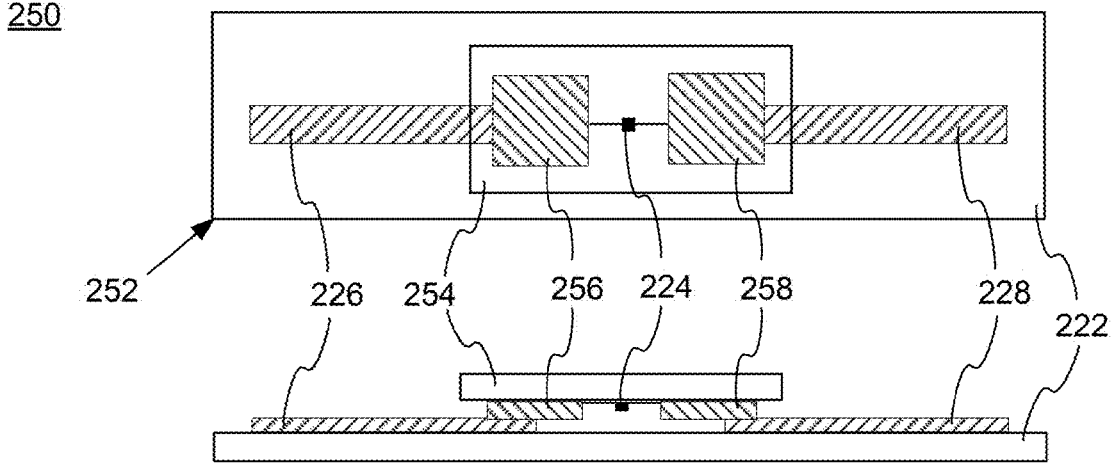
260
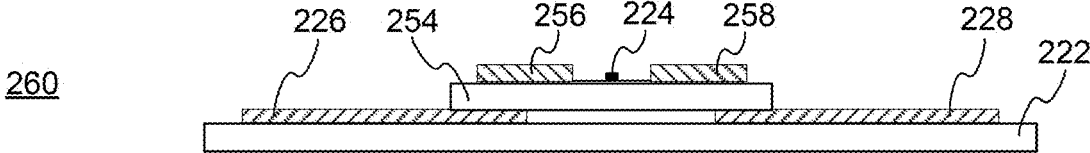
FIG. 2

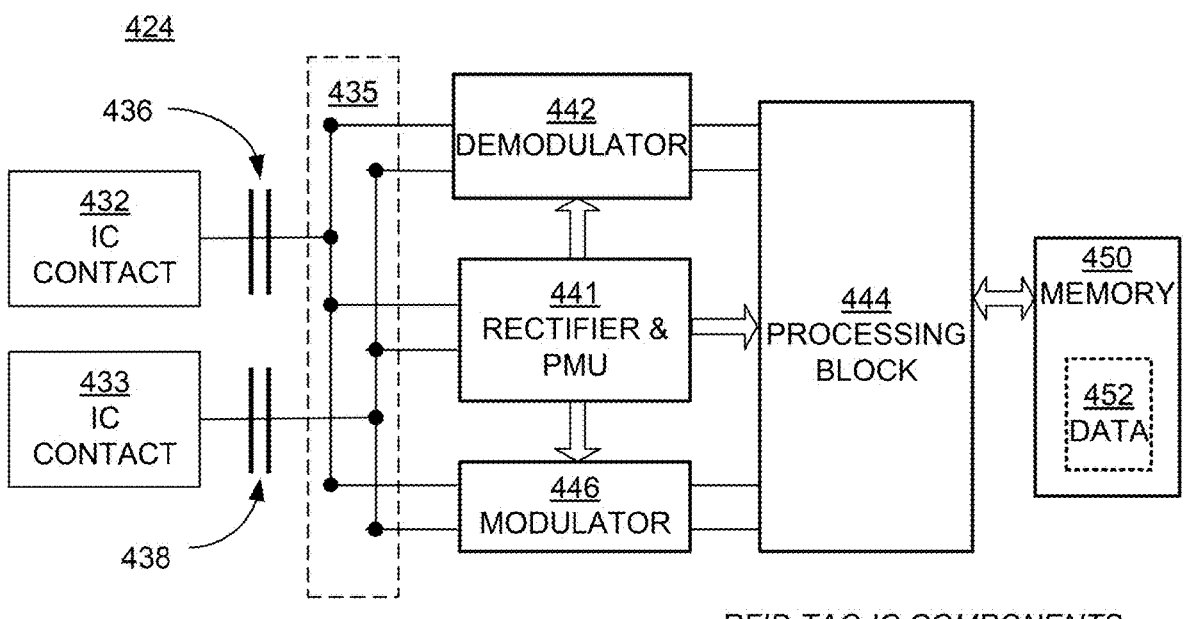
*RFID TAG IC COMPONENTS*
FIG. 4
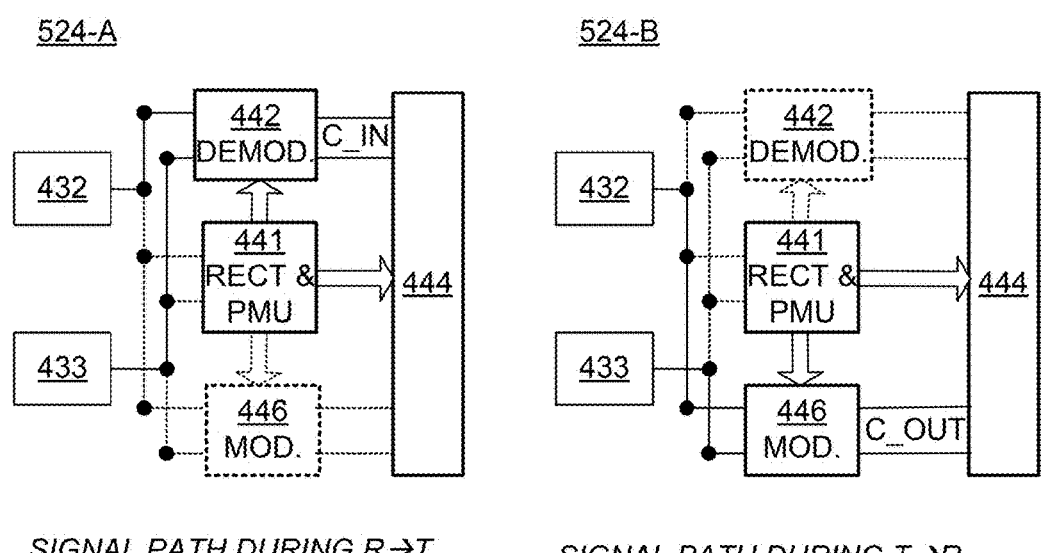
*SIGNAL PATH DURING R→T*
*SIGNAL PATH DURING T→R*
FIG. 5A                    FIG. 5B

706

| | Command | MemBank | WordPtr | WordCount | RN | CRC-16 |
|---|---|---|---|---|---|---|
| # of bits | 8 | 2 | EBV | 8 | 16 | 16 |
| description | 11000010 | 00: Reserved 01: EPC 10: TID 11: User | Starting address pointer | Number of words to read | handle | |

708

| | Header | Memory Words | RN | CRC-16 |
|---|---|---|---|---|
| # of bits | 1 | Variable | 16 | 16 |
| description | 0 | Data | handle | |

800

1002

| | Command | MemBank | WordPtr | WordCount | RN | CRC |
|---|---|---|---|---|---|---|
| # of bits | 8 | 2 | EBV | 8 | 16 | 16 |
| description | 11011000 | 00: RFU<br>01: RFU<br>10: TID<br>11: File_0 | Starting address pointer | Maximum number of words to read | handle | CRC-16 |

1004

| | Head~er | NumWords | MoreWords | Parity | MemoryWords | RN | CRC |
|---|---|---|---|---|---|---|---|
| # of bits | 1 | 8 | 7 | 1 | 16*NumWords | 16 | 16 |
| description | 0 | Number of MemoryWords | Availability of more words | Even parity bit | Data | handle | CRC-16 |

FIG. 10

RFID TAGS INDICATING AVAILABILITY OF ADDITIONAL DATA TO BE READ

CROSS-REFERENCE TO RELATED APPLICATIONS

This application claims priority to U.S. Provisional Patent Application Ser. No. 63/586,569 filed on Sep. 29, 2023. The disclosures of the Provisional Application are hereby incorporated by reference in their entirety.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to inventory one or more RFID tags, where inventorying involves singulating a tag, receiving an identifier from a tag, and/or acknowledging a received identifier (e.g., by transmitting an acknowledge command). "Singulated" is defined as a reader singling-out one tag, potentially from among multiple tags, for a reader-tag dialog. "Identifier" is defined as a number identifying the tag or the item to which the tag is attached, such as a tag identifier (TID), electronic product code (EPC), etc. The reader transmitting a Radio-Frequency (RF) wave performs the interrogation. The RF wave is typically electromagnetic, at least in the far field. The RF wave can also be predominantly electric or magnetic in the near or transitional near field. The RF wave may encode one or more commands that instruct the tags to perform one or more actions.

In typical RFID systems, an RFID reader transmits a modulated RF inventory signal (a command), receives a tag reply, and transmits an RF acknowledgement signal responsive to the tag reply. A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section included an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to accessing relevant data in a tag memory bank that a reader may not be aware of. In one approach, an additional field may be included in a tag reply to a read command that indicates whether additional data is available. The field may indicate, for example, (1) there is no additional data available, (2) there is additional data available, or (3) a specific amount of additional data is available.

According to some examples, a method for a radio frequency identification (RFID) integrated circuit (IC) to wirelessly send data is provided. The method may include receiving, from an RFID reader, a wireless command requesting first data from a memory bank of the RFID tag IC. The RFID tag IC may determine whether the first data are available. Upon determining that at least a portion of the first data is available, the RFID tag IC may determine whether additional data are also available from the memory bank. Upon determining that the additional data are also available, the RFID tag IC may respond to the wireless command by wirelessly sending the available first data portion combined with an indication of an available amount of the additional data, without receiving any intervening commands between sending the first data and the indication.

According to other examples, the indication may either include a value of the amount of the additional data or indicate that the amount of the additional data is more than a maximum value. If the additional data are not also available from the memory bank, the method may include responding to the wireless command by one of sending the available first data portion without an additional data indication, or wirelessly sending the available first data portion combined with an indication that no additional data is available. Responding to the wireless command with the first data may additionally include a length of the available first data portion. The additional data may be located contiguously after the first data in the memory bank of the RFID IC.

According to yet other examples, a Radio Frequency Identification (RFID) integrated circuit (IC) is provided. The RFID IC may comprise a memory configured to store data and including one or more memory banks. The RFID IC may also include a transceiver configured to receive commands and send replies. The RFID IC may additionally include a processing block coupled to the memory and the transceiver. The processing block may be configured to receive, via the transceiver, a wireless command from an RFID reader requesting first data from a memory bank of the RFID tag IC. The processing block may then be configured to determine whether the first data are available. Upon determining that at least a portion of the first data is available, the processing block may be configured to determine whether additional data are also available from the memory bank. Upon determining that the additional data are also available, the processing block may be configured to respond to the command by wirelessly sending the available first data portion combined with an indication of an available amount of the additional data, without receiving any intervening commands between sending the first data and the indication.

According to further examples, a method for a Radio Frequency Identification (RFID) reader to retrieve data from an RFID tag is provided. The method may include sending a command requesting first data from a memory bank of the RFID tag. The RFID reader may then receive a response including at least a portion of the requested first data and an indication of an amount of additional, unrequested data in the memory bank. The RFID reader may then, based on the indication, determine whether to retrieve the additional, unrequested data.

According to yet further examples a Radio Frequency Identification (RFID) reader may include a transceiver configured to transmit commands and receive replies. The RFID reader may also include a memory configured to store data. The RFID reader may additionally include a processing block coupled to the memory and the transceiver. The processing block may be configured to transmit, via the transceiver, a command requesting first data from a memory bank of an RFID tag. The processing block may further be configured to receive a response including the requested first data and an indication of an amount of additional, unrequested data in the memory bank. The processing block may additionally be configured to, based on the indication, determine whether to retrieve the additional, unrequested data.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 1 is a block diagram of components of an RFID system.

FIG. 2 is a diagram showing components of a passive RFID tag, such as a tag that can be used in the system of FIG. 1.

FIG. 4 is a block diagram showing a detail of an RFID tag, such as the one shown in FIG. 2.

FIGS. 5A and 5B illustrate signal paths during tag-to-reader and reader-to-tag communications in the block diagram of FIG. 4.

FIG. 10 illustrates example fields for a modified read command and corresponding reply fields, according to embodiments.

DETAILED DESCRIPTION

Figure 3:
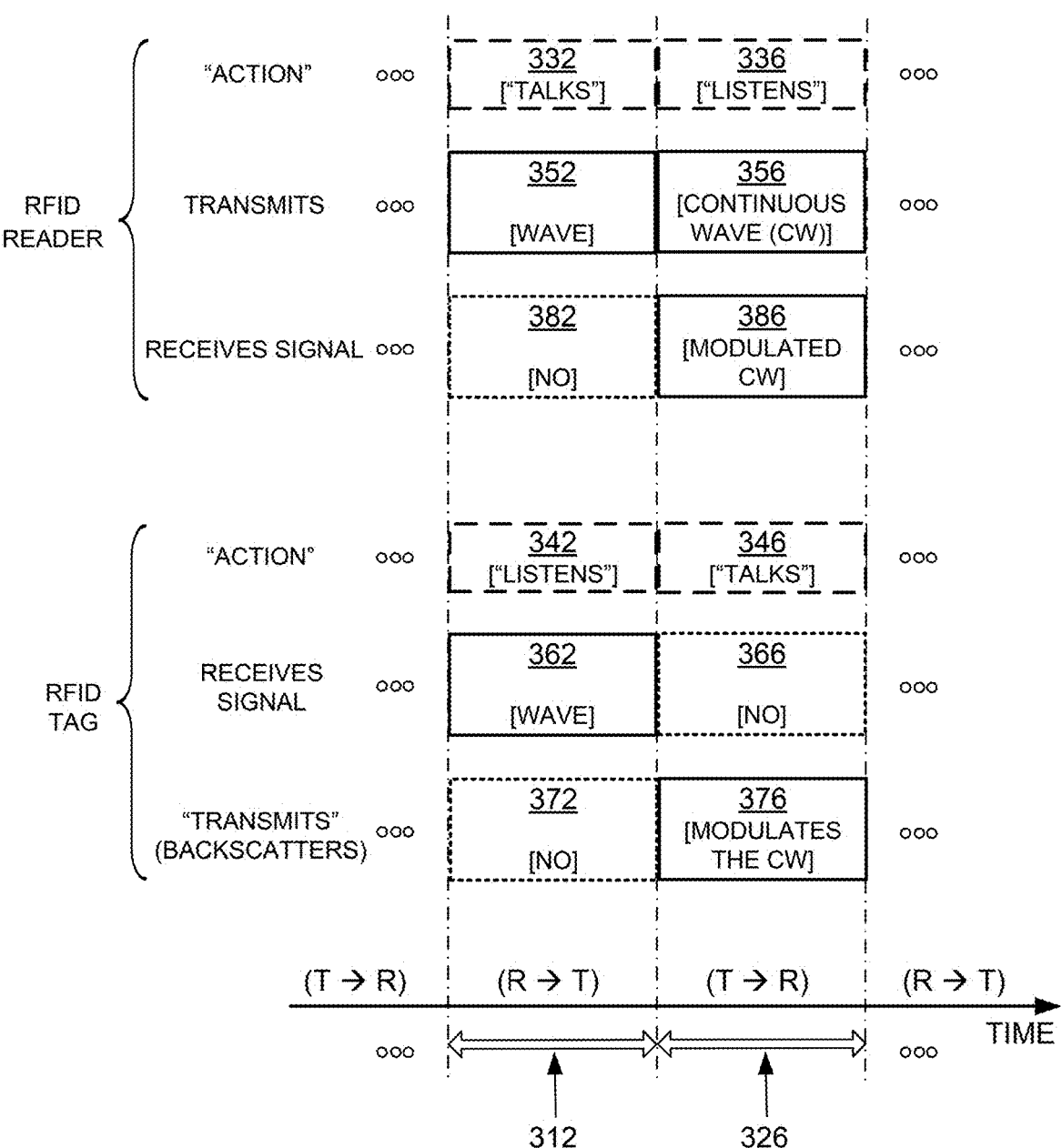
FIG. 3 is a conceptual diagram for explaining a half-duplex mode of communication between the components of the RFID system of FIG. 1.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar volatile and nonvolatile information-storage technologies as will be known to those skilled in the art. Some portions of memory may be writeable and some not. "Command" refers to a reader request for one or more tags to perform one or more actions, and includes one or more tag instructions preceded by a command identifier or command code that identifies the command and/or the tag instructions. "Instruction" refers to a request to a tag to perform a single explicit action (e.g., write data into memory). "Program" refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GS1 EPCglobal, Inc. ("Gen2 Protocol"), versions 1.2.0, 2.0, and 3.0 of which are hereby incorporated by reference.

In some RFID systems, a reader and tag communicate using an inventorying or similar process, and the reader can retrieve (receive) data stored in a memory bank of the tag. According to the Gen2 Protocol, the reader may read (e.g., using a Read command) data stored in tag memory by specifying a memory bank, a start location in the memory bank, and a number of words to read from that start location. However, in some cases, a tag may store more relevant data in the memory bank that the reader may not be aware of.

FIG. 1 is a diagram of the components of a typical RFID system 100, incorporating embodiments. An RFID reader 110 transmits a wireless interrogating RF signal 112. RFID tag 120 in the vicinity of RFID reader 110 senses interrogating RF signal 112 and generates a wireless signal 126 in response. RFID reader 110 senses and interprets signal 126. The signals 112 and 126 may include RF waves and/or non-propagating RF signals (e.g., reactive near-field signals).

Reader 110 and tag 120 communicate via wireless signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the terms "electrically isolated" or "electrically decoupled" as used herein mean that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling to a negligible level when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments, the positions of strap substrate 254 and inlay 222 may be reversed, with strap substrate 254 mounted beneath inlay 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which may both harvest power and respond if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the IC contacts of IC 224 can modulate the antenna's reflectance, as can varying the admittance of a shunt-connected circuit element which is coupled to the IC contacts. Varying the impedance of a series-connected circuit element is another means of modulating the antenna's reflectance. If IC 224 is capable of transmitting signals (e.g., has its own power source, is coupled to an external power source, and/or is able to harvest sufficient power to transmit signals), then IC 224 may respond by transmitting response signal 126.

In the embodiments of FIG. 2, antenna segments 226 and 228 are separate from IC 224. In other embodiments, the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

An RFID tag such as tag 220 is often attached to or associated with an individual item or the item packaging. An RFID tag may be fabricated and then attached to the item or packaging, or may be partly fabricated before attachment to the item or packaging and then completely fabricated upon attachment to the item or packaging. In some embodiments, the manufacturing process of the item or packaging may include the fabrication of an RFID tag. In these embodiments, the resulting RFID tag may be integrated into the item or packaging, and portions of the item or packaging may serve as tag components. For example, conductive item or packaging portions may serve as tag antenna segments or contacts. Nonconductive item or packaging portions may serve as tag substrates or inlays. If the item or packaging includes integrated circuits or other circuitry, some portion of the circuitry may be configured to operate as part or all of an RFID tag IC. An "RFID IC" may refer to an item capable of receiving and responding to RFID signals. For example, an item having a separate but attached RFID tag can be considered an RFID IC, as is an item having an integrated RFID tag or an item manufactured to have the capabilities of an RFID tag. A standalone RFID tag may also be referred to as an "RFID IC".

The components of the RFID system of FIG. 1 may communicate with each other in any number of modes. One such mode is called full duplex, where both reader 110 and tag 120 can transmit at the same time. In some embodiments, RFID system 100 may be capable of full duplex communication if tag 120 is configured to transmit signals as described above. Another such mode, suitable for passive tags, is called half-duplex, and is described below.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Interval 312 may typically be of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, which may also be referred to as a backscatter time interval or backscatter interval, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126, for example by adjusting its antenna reflectance. Concurrently, according to block 386, reader 110 receives backscatter signal 126 and processes it.

FIG. 4 is a block diagram showing a detail of an RFID IC, such as IC 224 in FIG. 2. Electrical circuit 424 in FIG. 4 may be formed in an IC of an RFID tag, such as tag 220 of FIG. 2. Circuit 424 has a number of main components that are described in this document. Circuit 424 may have a number of additional components from what is shown and described, or different components, depending on the exact implementation.

Circuit 424 shows two IC contacts 432, 433, suitable for coupling to antenna segments such as antenna segments 226/228 of RFID tag 220 of FIG. 2. When two IC contacts form the signal input from and signal return to an antenna they are often referred-to as an antenna port. IC contacts 432, 433 may be made in any suitable way, such as from metallic pads and so on. In some embodiments circuit 424 uses more than two IC contacts, especially when tag 220 has more than one antenna port and/or more than one antenna.

Circuit 424 includes signal-routing section 435 which may include signal wiring, signal-routing busses, receive/transmit switches, and so on that can route a signal to the components of circuit 424. In some embodiments IC contacts 432/433 couple galvanically and/or inductively to signal-routing section 435. In other embodiments (such as is shown in FIG. 4) circuit 424 includes optional capacitors 436 and/or 438 which, if present, capacitively couple IC contacts 432/433 to signal-routing section 435. This capacitive coupling causes IC contacts 432/433 to be galvanically decoupled from signal-routing section 435 and other circuit components.

Capacitive coupling (and resultant galvanic decoupling) between IC contacts 432 and/or 433 and components of circuit 424 is desirable in certain situations. For example, in some RFID tag embodiments IC contacts 432 and 433 may galvanically connect to terminals of a tuning loop on the tag. In this situation, capacitors 436 and/or 438 galvanically decouple IC contact 432 from IC contact 433, thereby preventing the formation of a short circuit between the IC contacts through the tuning loop.

Capacitors 436/438 may be implemented within circuit 424 and/or partly or completely external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 also includes a rectifier and PMU (Power Management Unit) 441 that harvests energy from the RF signal received by antenna segments 226/228 to power the circuits of IC 424 during either or both reader-to-tag (R→T) and tag-to-reader (T→R) sessions. Rectifier and PMU 441 may be implemented in any way known in the art, and may include one or more components configured to convert an alternating-current (AC) or time-varying signal into a direct-current (DC) or substantially time-invariant signal.

Circuit 424 additionally includes a demodulator 442 that demodulates the RF signal received via IC contacts 432, 433. Demodulator 442 may be implemented in any way known in the art, for example including a slicer, an amplifier, and so on.

Circuit 424 further includes a processing block 444 that receives the output from demodulator 442 and performs operations such as command decoding, memory interfacing, and so on. In addition, processing block 444 may generate an output signal for transmission. Processing block 444 may be implemented in any way known in the art, for example by combinations of one or more of a processor, memory, decoder, encoder, and so on.

Circuit 424 additionally includes a modulator 446 that modulates an output signal generated by processing block 444. The modulated signal is transmitted by driving IC contacts 432, 433, and therefore driving the load presented by the coupled antenna segment or segments. Modulator 446 may be implemented in any way known in the art, for example including a switch, driver, amplifier, and so on.

In one embodiment, demodulator 442 and modulator 446 may be combined in a single transceiver circuit. In another embodiment modulator 446 may modulate a signal using backscatter. In another embodiment modulator 446 may include an active transmitter. In yet other embodiments demodulator 442 and modulator 446 may be part of processing block 444.

Circuit 424 additionally includes a memory 450 to store data 452. At least a portion of memory 450 is preferably implemented as a nonvolatile memory (NVM), which means that data 452 is retained even when circuit 424 does not have power, as is frequently the case for a passive RFID tag.

In some embodiments, particularly in those with more than one antenna port, circuit 424 may contain multiple demodulators, rectifiers, PMUs, modulators, processing blocks, and/or memories.

In terms of processing a signal, circuit 424 operates differently during a R→T session and a T→R session. The different operations are described below, in this case with circuit 424 representing an IC of an RFID tag.

FIG. 5A shows version 524-A of components of circuit 424 of FIG. 4, further modified to emphasize a signal operation during a R→T session during time interval 312 of FIG. 3. Demodulator 442 demodulates an RF signal received from IC contacts 432, 433. The demodulated signal is provided to processing block 444 as C_IN. In one embodiment, C_IN may include a received stream of symbols.

Version 524-A shows as relatively obscured those components that do not play a part in processing a signal during a R→T session. Rectifier and PMU 441 may be active, such as for converting RF power. Modulator 446 generally does not transmit during a R→T session, and typically does not interact with the received RF signal significantly, either because switching action in section 435 of FIG. 4 decouples modulator 446 from the RF signal, or by designing modulator 446 to have a suitable impedance, and so on.

Although modulator 446 is typically inactive during a R→T session, it need not be so. For example, during a R→T session modulator 446 could be adjusting its own parameters for operation in a future session, and so on.

FIG. 5B shows version 524-B of components of circuit 424 of FIG. 4, further modified to emphasize a signal operation during a T→R session during time interval 326 of FIG. 3. Processing block 444 outputs a signal C_OUT. In one embodiment, C_OUT may include a stream of symbols for transmission. Modulator 446 then modulates C_OUT and provides it to antenna segments such as segments 226/228 of RFID tag 220 via IC contacts 432, 433.

Version 524-B shows as relatively obscured those components that do not play a part in processing a signal during a T→R session. Rectifier and PMU 441 may be active, such as for converting RF power. Demodulator 442 generally does not receive during a T→R session, and typically does not interact with the transmitted RF signal significantly, either because switching action in section 435 of FIG. 4 decouples demodulator 442 from the RF signal, or by designing demodulator 442 to have a suitable impedance, and so on.

Although demodulator 442 is typically inactive during a T→R session, it need not be so. For example, during a T→R session demodulator 442 could be adjusting its own parameters for operation in a future session, and so on.

In typical embodiments, demodulator 442 and modulator 446 are operable to demodulate and modulate signals according to a protocol, such as the Gen2 Protocol mentioned above. In embodiments where circuit 424 includes multiple demodulators and/or modulators, each may be configured to support different protocols or different sets of protocols. A protocol specifies, in part, symbol encodings, and may include a set of modulations, rates, timings, or any other parameter associated with data communications. In addition, a protocol can be a variant of a stated specification such as the Gen2 Protocol, for example including fewer or additional commands than the stated specification calls for, and so on. In such instances, additional commands are sometimes called custom commands.

Figure 6:
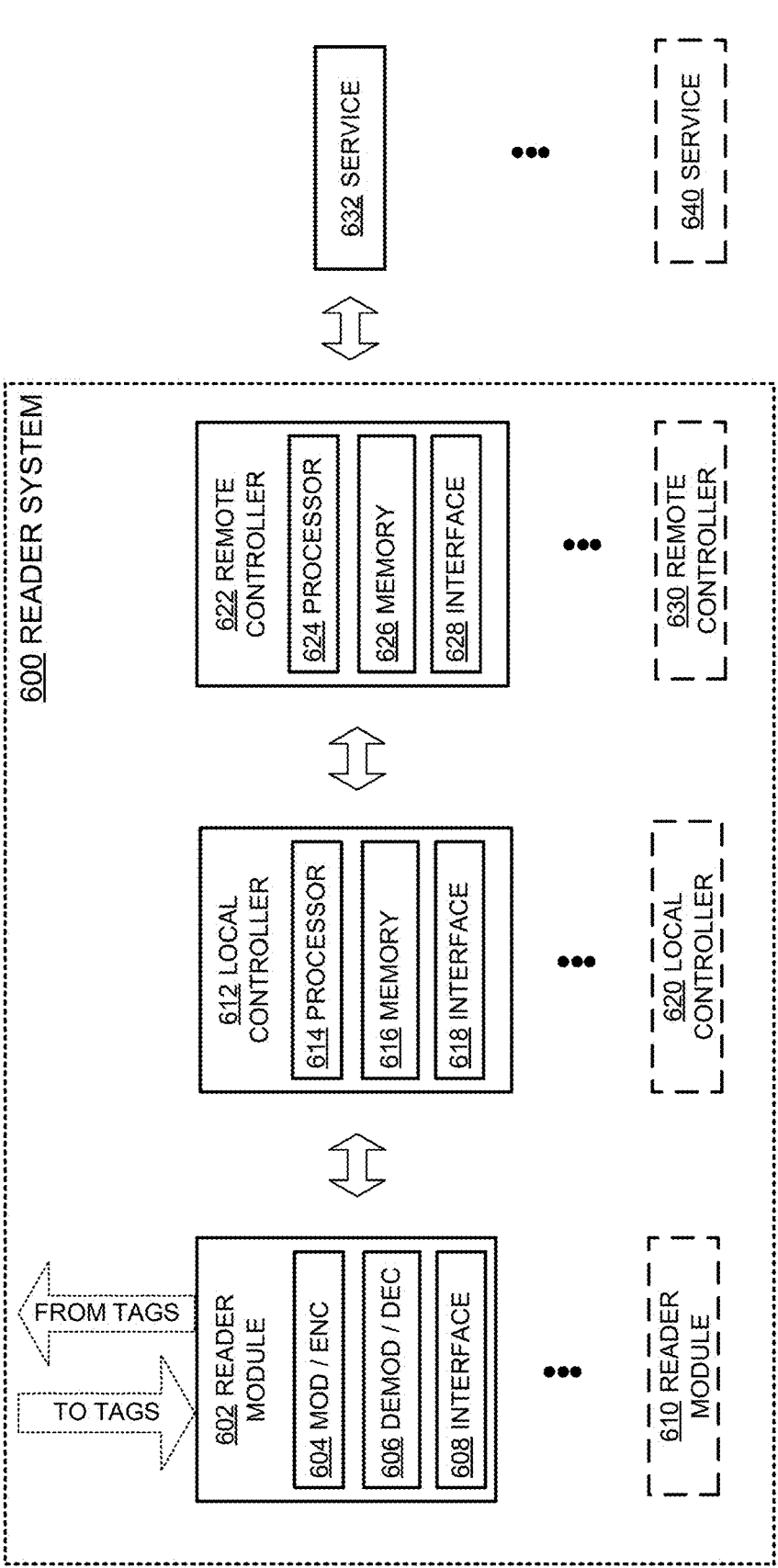
FIG. 6 is a block diagram showing a detail of an RFID reader system, such as the one shown in FIG. 1.

FIG. 6 is a block diagram of an RFID reader system 600 according to embodiments. RFID reader system 600 includes a local block 610, and optionally remote components 670. Local block 610 and remote components 670 can be implemented in any number of ways. For example, local block 610 or portions of local block 610 may be implemented as a standalone device or as a component in another device. In some embodiments, local block 610 or portions of local block 610 may be implemented as a mobile device, such as a handheld RFID reader, or as a component in a mobile device, such as a laptop, tablet, smartphone, wearable device, or any other suitable mobile device. It will be recognized that RFID reader 110 of FIG. 1 is the same as local block 610, if remote components 670 are not provided. Alternately, RFID reader 110 can be implemented instead by RFID reader system 600, of which only the local block 610 is shown in FIG. 1.

In some embodiments, one or more of the blocks or components of reader system 600 may be implemented as integrated circuits. For example, local block 610, one or more of the components of local block 610, and/or one or more of the remote component 670 may be implemented as integrated circuits using CMOS technology, BJT technology, MESFET technology, and/or any other suitable implementation technology.

Local block 610 is responsible for communicating with RFID tags. Local block 610 includes a block 651 of an antenna and a driver of the antenna for communicating with the tags. Some readers, like that shown in local block 610, contain a single antenna and driver. Some readers contain multiple antennas and drivers and a method to switch signals among them, including sometimes using different antennas for transmitting and for receiving. Some readers contain multiple antennas and drivers that can operate simultaneously. In some embodiments, block 651 may be a phased-array antenna or synthesized-beam antenna (SBA), and local block 610 may be implemented in a synthesized-beam reader (SBR) configured to generate one or more beams via the SBA. A demodulator/decoder block 653 demodulates and decodes backscattered waves received from the tags via antenna/driver block 651. Modulator/encoder block 654 encodes and modulates an RF wave that is to be transmitted to the tags via antenna/driver block 651.

Local block 610 additionally includes an optional local processor 656. Local processor 656 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 653, the encoding function in block 654, or both, may be performed instead by local processor 656. In some cases, local processor 656 may implement an encryption or authentication function; in some cases, one or more of these functions can be distributed among other blocks such as encoding block 654, or may be entirely incorporated in another block.

Local block 610 additionally includes an optional local memory 657. Local memory 657 may be implemented in any number of ways known in the art, including, by way of example and not of limitation, any of the memory types described above as well as any combination thereof. Local memory 657 can be implemented separately from local processor 656, or in an IC with local processor 656, with or without other components. Local memory 657, if provided, can store programs for local processor 656 to run, if needed.

In some embodiments, local memory 657 stores data read from tags, or data to be written to tags, such as Electronic Product Codes (EPCs), Tag Identifiers (TIDs) and other data. Local memory 657 can also include reference data that is to be compared to EPCs, instructions and/or rules for how to encode commands for the tags, modes for controlling antenna 651, encryption/authentication algorithms, algorithms for tracking tag location or movement, secret keys, key pairs, individual public and/or private keys, electronic signatures, and so on. In some of these embodiments, local memory 657 is provided as a database.

Some components of local block 610 typically treat the data as analog, such as the antenna/driver block 651. Other components such as local memory 657 typically treat the data as digital. At some point, there is a conversion between analog and digital. Based on where this conversion occurs, a reader may be characterized as "analog" or "digital", but most readers contain a mix of analog and digital functionality.

If remote components 670 are provided, they are coupled to local block 610 via an electronic communications network 680. Network 680 can be a Local Area Network (LAN), a Metropolitan Area Network (MAN), a Wide Area Network (WAN), a network of networks such as the internet, or a local communication link, such as a USB, PCI, and so on. Local block 610 may include a local network connection 659 for communicating with communications network 680 or may couple to a separate device or component configured to communicate with communications network 680. Communications on the network can be secure, such as if they are encrypted or physically protected, or insecure if they are not encrypted or otherwise protected.

There can be one or more remote component(s) 670. If more than one, they can be located at the same location, or in different locations. They may communicate with each other and local block 610 via communications network 680, or via other similar networks, and so on. Accordingly, remote component(s) 670 can use respective remote network connections. Only one such remote network connection 679 is shown, which is similar to local network connection 659, etc. In some embodiments, a single one of the remote component(s) 670 may be configured to communicate with and/or control multiple local blocks, each similar to local block 610.

Remote component(s) 670 can also include a remote processor 676. Remote processor 676 can be made in any way known in the art, such as was described with reference to local processor 656. Remote processor 676 may also implement an encryption/authentication function and/or a tag location/tracking function, similar to local processor 656.

Remote component(s) 670 can also include a remote memory 677. Remote memory 677 can be made in any way known in the art, such as was described with reference to local memory 657. Remote memory 677 may include a local database, and a different database of a standards organization, such as one that can reference EPCs. Remote memory 677 may also contain information associated with commands, tag profiles, keys, or the like, similar to local memory 657.

One or more of the above-described elements may be combined and designated as operational processing block 690. Operational processing block 690 includes those components that are provided of the following: local processor 656, remote processor 676, local network connection 659, remote network connection 679, and by extension an applicable portion of communications network 680 that links remote network connection 679 with local network connection 659. The portion can be dynamically changeable, etc. In addition, operational processing block 690 can receive and decode RF waves received via antenna/driver 651, and cause antenna/driver 651 to transmit RF waves according to what it has processed.

Operational processing block 690 includes either local processor 656, or remote processor 676, or both. If both are provided, remote processor 676 can be made such that it operates in a way complementary with that of local processor 656. In fact, the two can cooperate. It will be appreciated that operational processing block 690, as defined this way, is in communication with both local memory 657 and remote memory 677, if both are present.

Accordingly, operational processing block 690 is location independent, in that its functions can be implemented either by local processor 656, or by remote processor 676, or by a combination of both. Some of these functions are preferably implemented by local processor 656, and some by remote processor 676. Operational processing block 690 accesses local memory 657, or remote memory 677, or both for storing and/or retrieving data.

RFID reader system 600 operates by operational processing block 690 generating communications for RFID tags. These communications are ultimately transmitted by antenna/driver block 651, with modulator/encoder block 654 encoding and modulating the information on an RF wave. Then data is received from the tags via antenna/driver block 651, demodulated and decoded by demodulator/decoder block 653, and processed by operational processing block 690.

Embodiments of an RFID reader system can be implemented as hardware, software, firmware, or any combination. Such a system may be subdivided into components or modules. Some of these components or modules can be implemented as hardware, some as software, some as firmware, and some as a combination. An example of such a subdivision is now described, together with the RFID tag as an additional module.

Figure 7:
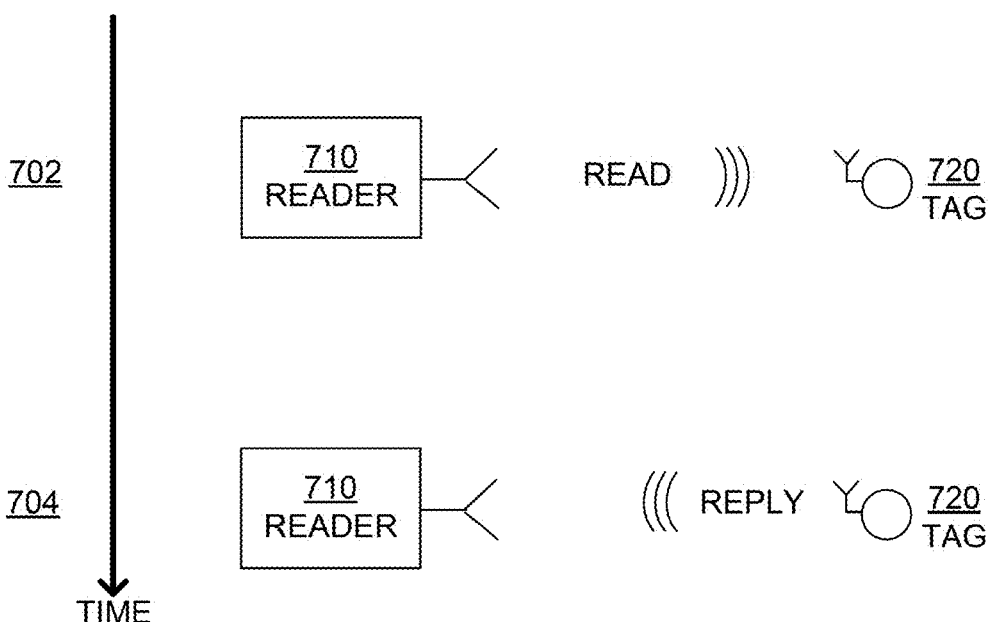
FIG. 7 illustrates a portion of a tag access process, fields of a read command used to access tag memory, and fields of a corresponding tag reply.

RFID readers and tags can communicate using inventorying and access processes that involve the exchange of information. FIG. 7 depicts a portion of a tag access process, fields of a read command used to access tag memory, and fields of a corresponding tag reply. At time 702, reader 710 transmits a "read" command to tag 720. The "read" command may allow a reader to read part or all of a tag's memory, and may specify or request data ("DATA") stored in particular areas of the tag's memory, for example by specifying a memory location and/or a data length. One example of a "read" command is a Read command according to the Gen2 Protocol, which allows a reader to read data (in the form of 16-bit "words") from part or all of a Gen2 tag's Reserved, EPC, TID, or User memory banks. According to the Gen2 Protocol, the Read command may have the following fields 706. The MemBank field specifies whether the Read command accesses the Reserved, EPC, TID, or User memory bank. Each Read command only allows access to a single memory bank, but successive Read commands may allow access to other, different memory banks. The WordPtr field specifies the starting word address (as an extensible bit vector or EBV, described in Annex A of the Gen2 Protocol) for the memory read, where words are 16 bits in length. For example, a WordPtr field of 00h (value expressed in hexadecimal) specifies the first 16-bit memory word, WordPtr=01h specifies the second 16-bit memory word, etc. The WordCount field specifies the number of 16-bit words to be read. If the word count field value is 00h, the tag may backscatter the contents of the chosen memory bank starting at the WordPtr field value and ending at the end of the bank. The Read command also includes the tag's handle (RN) and a CRC-16. The CRC-16 may be calculated over the first command-code bit to the last handle bit.

At time 704, the tag 720 may backscatter a reply to the reader 710. The reply may include the "DATA" requested by the preceding "read" command and stored in tag memory. For example, a reply to a Gen2 Read command may include the following fields 808: a 1-bit header, the requested memory words, the tag's handle (RN), and the CRC-16. As discussed herein, if a reader requests a certain number of words from a certain memory bank but additional, unrequested words also exist in that memory bank, the reader will not receive (or be aware of) those additional words.

Figure 8:
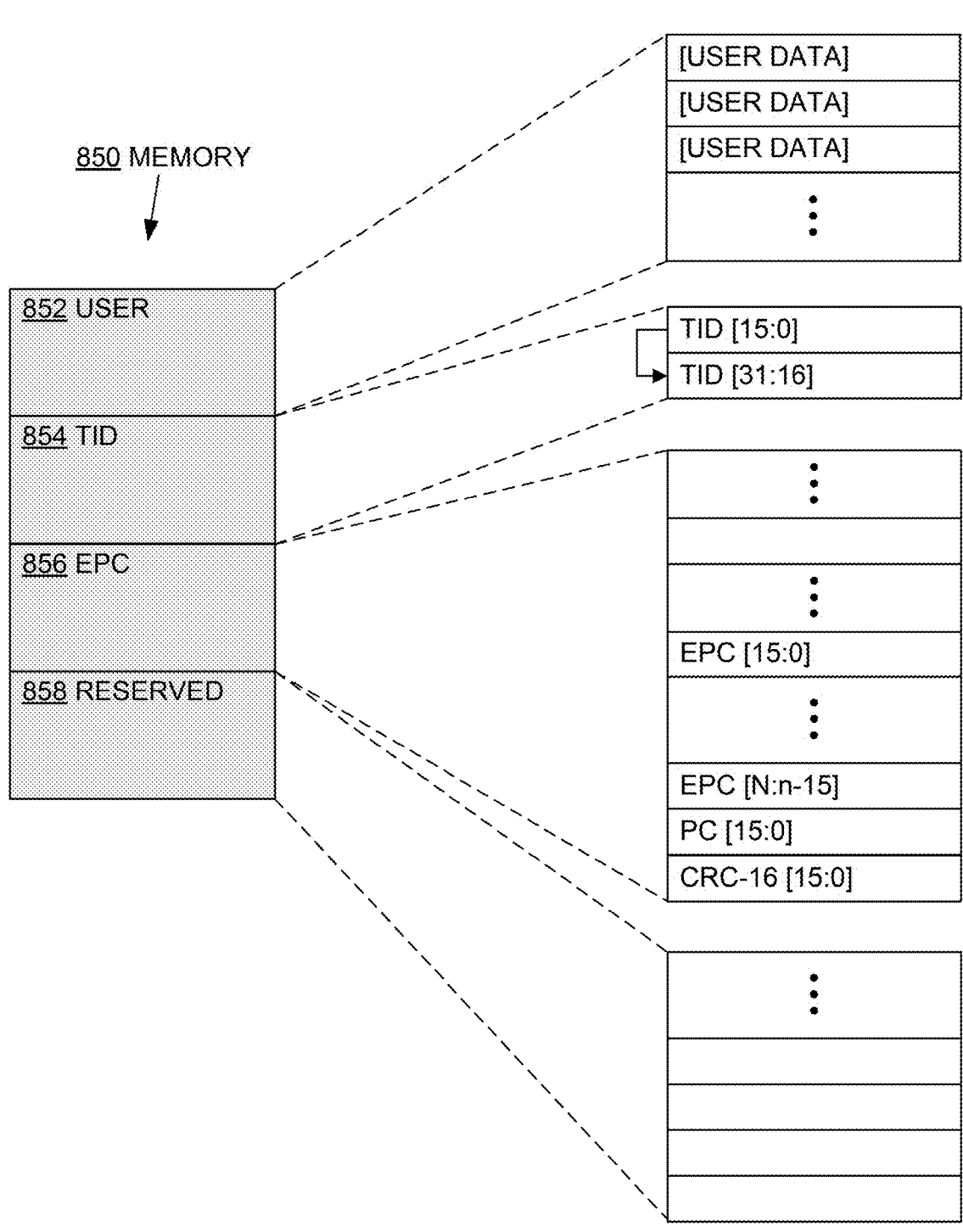
FIG. 8 is a diagram of an example RFID tag IC memory configuration, according to embodiments.

FIG. 8 is a diagram of an example RFID tag IC memory configuration, according to embodiments. Diagram 800 depicts an RFID tag IC memory 850, like the physical memory configuration described in the Gen2 Protocol. Memory 850 includes four partitions, sections, or banks 852, 854, 856, and 858. Partition 852 ("User memory") may be configured to store user data. Partition 854 ("TID memory") may be configured to store an identifier for the tag IC itself, such as a tag identifier or TID. Partition 856 ("EPC memory") may be configured to store an identifier for an item associated with or attached to the tag IC, such as an electronic product code or EPC. Partition 858 ("Reserved memory") may be configured to store information reserved for the tag IC itself or otherwise not necessarily publicly accessible, such as passwords, PINs, cryptographic keys, or similar. The Gen2 Protocol specifies that two passwords, the Access password and the Kill password, can be stored in partition 858. The Access password, if present, can be used to restrict certain tag IC operations as described in the Gen2 Protocol. The Kill password, if present, can be used to cause a tag IC to enter the Killed state as described in the Gen2 Protocol. As these passwords are sensitive, partition 858 is generally not publicly accessible.

The configuration of tag IC memory 850 is provided as an example. Tag IC memory can have any number of partitions configured to store any suitable information.

Figure 9:
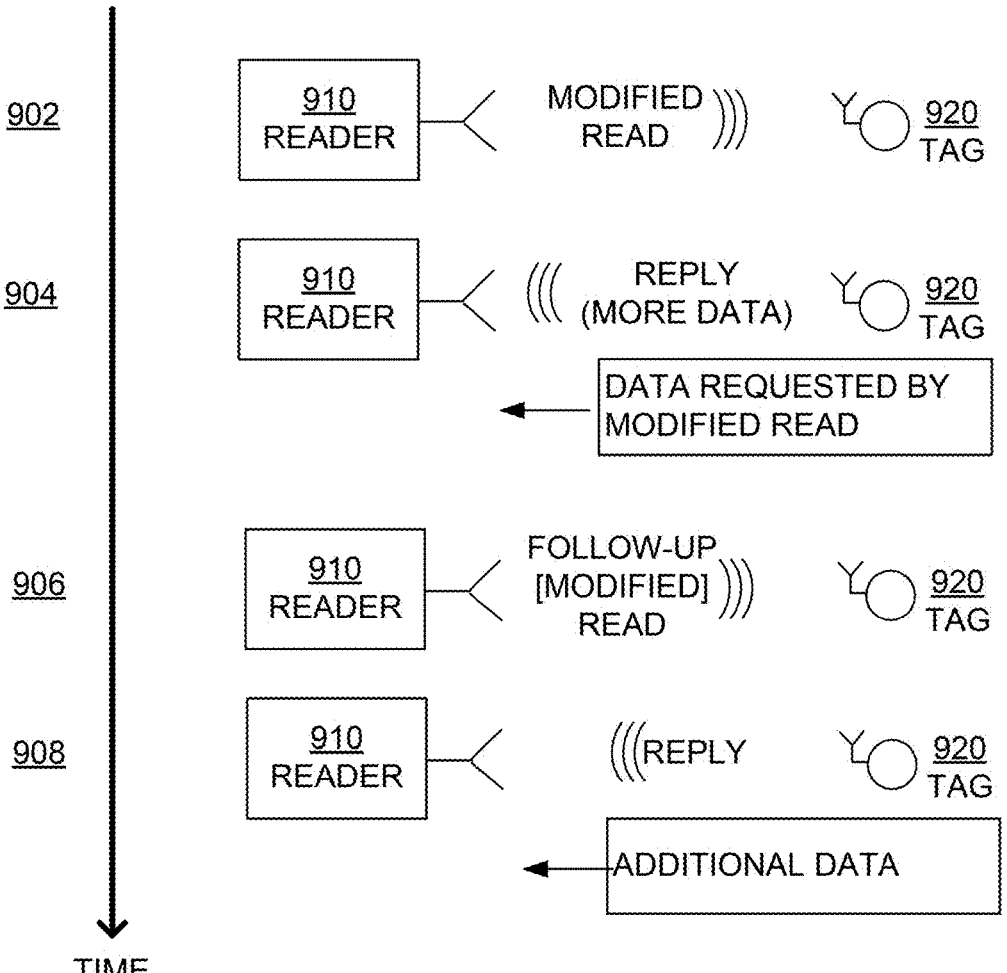
FIG. 9 illustrates an example modified read command and reply exchange between an RFID reader and an RFID tag, according to embodiments.

FIG. 9 illustrates an example modified read command and reply exchange between an RFID reader and an RFID tag, according to embodiments. As shown in FIG. 9, a reader 910 may transmit a modified read command to a tag 920 at a time 902 requesting data ("DATA") from tag 920. Similar to the "read" command described above, the modified read command may specify the requested data in terms of a specific amount of data at a specific tag memory location. At a time 904, the tag 920 may send a reply with the requested data. Further, the tag 920 may include in the reply an indication or parameter that indicates whether additional data, beyond that requested by the modified read command, is available. In this example, the indication may indicate that in fact additional unrequested data is available ("MORE-WORDS"). "Availability" may mean that the data is in fact stored/present in the memory, or may mean that the data is both stored/present and that the tag will provide the data to the reader. For example, a tag may be configured to provide certain data only to authorized readers. In this situation, the data may be present but not available to unauthorized readers.

Upon receiving the tag reply and determining that additional, unrequested data is available, the reader 910 may determine whether to retrieve the additional, unrequested data. If the reader 910 determines that it should retrieve the additional, unrequested data, it may transmit a follow-up read or modified read command at time 906 to the tag 920 requesting the additional data ("DATA2"). At time 908, the tag 920 may reply with the now-requested, additional data.

As described above, a tag's reply to a modified read command may include an indication as to whether additional data, beyond that requested by the modified read command, is available. In some, more specific examples, the indication may indicate (a) that no additional data is available, (b) that an unspecified quantity of additional data is available, or (c) that a specific quantity of additional data is available. If the modified read command specifies a starting memory location for the requested data and a length of the requested data, then the additional data may be contiguous to and after or before the requested data.

FIG. 10 illustrates example fields for a modified read command and corresponding reply fields, according to embodiments. One example of a modified read command may be a ReadVar command of the Gen2 Protocol. As shown in FIG. 10, a modified read command 1002 may include an 8-bit command code field (Command) followed by a 2-bit memory bank indicator (MemBank) specifying a memory bank to access, a word pointer (WordPtr) field value indicating a starting point (as an EBV) for the requested words in the indicated memory bank, a word count field value indicating a requested number of words, a tag handle (RN), and a CRC-16 (CRC). The modified read command, or wireless command, may instruct a tag to respond with a requested number of words (specified by, e.g., a word count field value) in a certain memory bank (specified by, e.g., a memory bank field value), starting at a certain word (indicated by, e.g., a word pointer field value). The modified read command may instruct the tag to additionally respond with an indication of an available amount of additional data stored in the memory bank.

The maximum word count in the modified read command 1002 is represented by 8 bits, allowing the specification of up to 255 words (note that a specified word count of zero may correspond to a request for all available words in the memory bank to be returned, versus zero words). However, other maximum specified word count numbers may also be used in different implementations. Furthermore, memory banks that may be implemented are not limited to those shown as example memory banks in FIG. 7, 8, or 10.

In response to receiving a modified read command such as command 1002, a tag may send a single reply that combines the requested data with an indication that more data is available. For example, a tag reply 1004 to modified read command 1002 may begin with a 1-bit header (Header), followed by an 8-bit NumWords field indicating a number of memory words being transmitted by the tag, a 7-bit More-Words field indicating the availability of more words stored at the tag, a parity bit (Parity), the requested memory words (MemoryWords), the tag handle (RN), and the CRC-16. In some embodiments, the reply may also include an indication of the location of the additional words in memory, such as by including a value that points to the memory location of the start of the additional words stored in memory. In some embodiments, the additional words may be stored contiguously after the requested data, and the reply may include an indication that the additional data are stored as such.

In some examples, when responding to a modified read command, a tag reply may have a MoreWords field value of (1) "0000000" if no additional data is available beyond what is requested by the modified read command, (2) "1111111" if more data is available beyond what is requested by the modified read command, or (3) the number, expressed in binary, of available data words, if less than 127 data words. For example, a MoreWords field value of "1111111" corresponds to either (a) more words are available, or (b) more than 127 words are available. In other examples, the field may be of any size.

The modified read command 1002 requests (via the WordCount field) a certain amount of data from a tag. In an example scenario, if the modified read command requests 6 words starting at a particular tag memory location and the tag only has 6 words available in tag memory starting from that location, then the tag may respond with the 6 words and a MoreWords field value of "0000000". If the tag has, e.g., 10 words available, then it may respond with the 6 words requested and either a MoreWords value of "1111111" ("more words are available") or "0000100" ("four more words are available"). If the tag has fewer words than requested, then it may reply with what it has, and a More-Words field value of "0000000".

The NumWords field indicates how many words the tag is replying with. In an example scenario, if the reader requests 6 words starting at a particular tag memory location and the tag has at least 6 words starting from that location, then NumWords may be "00000110" (corresponding to "6"), and MoreWords may depend on whether the tag has more than 6 words available starting at that location. If the tag has fewer than 6 words available starting from that location (e.g., 4 words), then the tag may reply with its available words (e.g., 4) and NumWords may indicate the number of available words (e.g., "00000100", corresponding to "4").

The names, content, order, and sizes of the fields of a modified read command and a tag reply as shown in FIG. 10 are for illustration purposes only. Other fields, content, order, and sizes may be implemented for the reader command and corresponding tag reply using the principles described herein.

Figure 11:
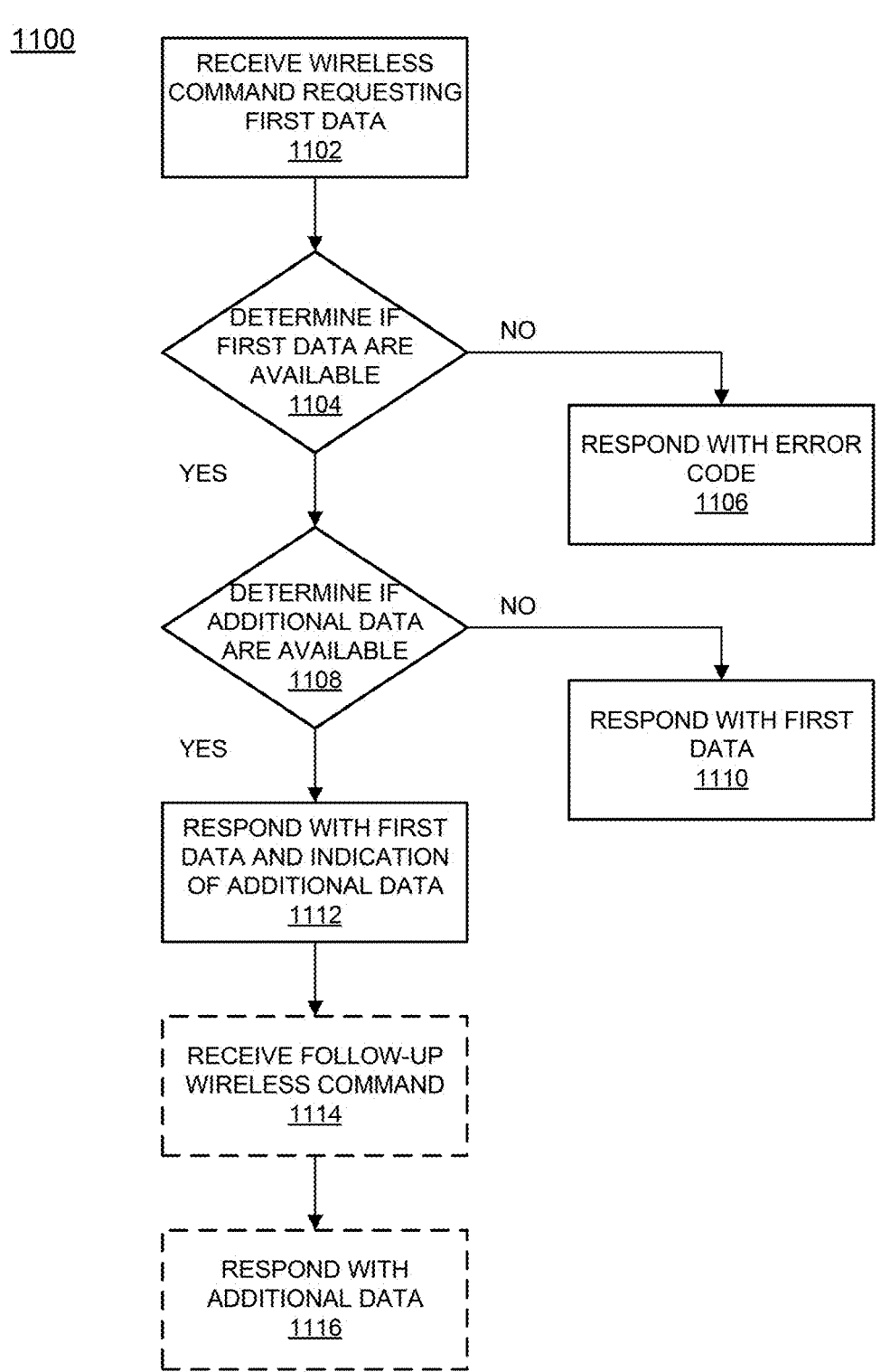
FIG. 11 is a flow diagram of a method for an RFID tag indicating to an RFID reader that additional data are available in tag memory beyond that requested by the reader, according to embodiments.

FIG. 11 is a flow diagram of a method 1100 for an RFID IC or tag to wirelessly send data to an RFID reader. The RFID reader may transmit a request for first data from a memory bank of the RFID IC. The method 1100 may allow the RFID IC to provide the first data and an indication to the RFID reader that additional data are available in tag memory beyond the requested first data, according to embodiments. The steps described in the method 1100 are for illustrative purposes only. These steps may be implemented using additional or fewer steps and in different orders using the principles described herein.

At step 1102, the RFID IC may receive a wireless command requesting first data from a memory bank of the RFID IC. The wireless command may instruct the RFID IC to respond with the first data combined with an indication of additional data, if any are available. The wireless command may include an indication of a location in a memory of the RFID IC to access to retrieve the first data. In some embodiments, the wireless command may further include a request for a first amount of the first data.

In some embodiments, the wireless command may be a modified read command, such as a ReadVar command of the Gen2 Protocol, as described in FIG. 10. The modified read command includes a command code field, a memory bank indicator, a word pointer field value, a word count field value, a tag handle (RN), and a CRC-16 (CRC). In this example, the 8-bit command code field identifies the wireless command as a modified read command, which instructs the RFID IC to respond with the first data combined with the indication of additional data, if any are available. The command code field may be an 8-bit field, populated by the 8-bit binary number '11011000' indicating that the wireless command is a Gen2 Protocol ReadVar command. The RFID reader can use the memory bank indicator, the word pointer field value, and the word count field value to request the first data from the RFID IC. More explicitly, the memory bank indicator can specify a memory bank of the RFID IC to access, the word pointer field can indicate a starting point in the memory bank, and the word count field value can specify the length of the first data to retrieve. The wireless command may yet further include a tag handle (e.g., an RN field value), and an error correction code (e.g., a CRC-16).

At step 1104, the RFID IC may determine whether the first data are available. The RFID IC may access memory determine if at least a portion of the first data is stored/ present in memory. In some embodiments, the RFID IC may further determine if the RFID reader is authorized to access the first data. In the example of a modified read command, the RFID IC may access the memory bank indicated by the memory bank indicator at the memory location indicated by the word pointer field value to determine if at least a portion of the first data is stored/present at that location in memory. In some embodiments, the portion of the first data may have a length equal to or less than the word count value in the modified read command.

At step 1106, upon determining that the first data are not available, the RFID IC may respond to the wireless command by wirelessly sending an error code to the RFID reader. For example, the RFID IC may determine that the first data is not stored/present in the memory location specified by the wireless command. In another example, the RFID IC may determine that the first data is present, but the RFID reader is not authorized to access the first data.

At step 1108, upon determining that at least a portion of the first data is available, the RFID IC may then determine if additional data are available. In some embodiments, the additional data may be located contiguously after or before the first data in the memory bank of the RFID IC. For example, the RFID IC may determine that more data is stored at the location specified by the wireless command than was requested. In some embodiments, the RFID IC may additionally make a determination, dependent or independently of the determination made with regards to the first data, as to if the RFID reader is authorized to access the additional data.

At step 1110, upon determining that no additional data is available, the RFID IC may respond to the wireless command by sending the first data portion to the RFID reader. In some embodiments, if the RFID reader requests the first data by including a request a first amount of the first data in the wireless command, the RFID IC can proceed with step 1110 if the amount of first data is less than or equal to the first amount. In some embodiments, the RFID IC may additionally include a length of the available first data portion in its response. In some embodiments, the RFID IC may respond to the wireless command by sending the available first data portion without an additional data indication, or combined with an indication that no additional data are available.

The modified read command of FIG. 10 can be used in the following two examples. In a first example, the first data portion may have a length less than the requested first amount in the wireless command. More specifically, suppose a wireless command requested a length of 6 words (e.g., a binary word count field value of '00000110') but a first data portion having a length of 4 words (e.g., 4 total words in the MemoryWords field). The RFID IC may respond with the 4 words and additionally indicate the length ("4") of the first data portion (e.g., by including a binary NumWords field value of '00000100' in the reply). In a second example, the first data portion may have a length equal to the requested first amount in the modified read command. Suppose in this second example, the first data portion has a length of 6 words and the wireless command requested 6 words. In this second example, the RFID IC may respond with the 6 words and additionally indicate the length ("6") of the first data portion, for example by including a binary NumWords field value of '00000110' in the reply. In both the first and second examples (i.e., when the RFID IC determines that additional data are not available in the memory bank), the RFID IC may respond to the wireless command by sending the available first data portion without an additional data indication, or combined with an indication that no additional data are available (e.g., a binary MoreWords field value of '0000000'), At step 1112, upon determining that additional data are available, the RFID IC may respond to the wireless command by sending the first data portion combined with an indication of an available amount of the additional data, without receiving any intervening commands between sending the first data portion and the indication. The RFID IC can proceed with step 1112 if the amount of first data available is greater than the first data requested by the wireless command. The indication of the available amount of additional data may indicate (1) a value of the amount of additional data or (2) that the amount is greater than a maximum value. In some embodiments, the RFID IC may additionally include a length of the available first data portion.

As an example of step 1112, again referring to the modified read command of FIG. 10, if the modified read command requests 6 words of data, but the tag has 10 words stored in the memory specified by the wireless command, then the RFID tag IC may respond to the RFID reader by sending the available first data portion of 6 words combined with an indication that 4 additional words are available (i.e., MoreWords='0000100'). As another example, if the wireless command requests 6 words of data but the tag stores more additional words than can be specified in the indication (e.g., for a 7-bit field value, such as in this example of MoreWords, up to a maximum of 127 additional words can be specified), then the indication may be '1111111' indicating that the amount of available additional data is greater than a maximum value (e.g., 127 words). Note that in this particular embodiment the indication may be the same ('1111111') if the amount of available additional data is the maximum value or exceeds the maximum value.

More generally, if the number of words stored in the tag memory is higher than a number of requested words (e.g., indicated in a word count field value) in the wireless command, the RFID IC may respond to the wireless command with the first data portion combined with a nonzero indication of additional available data (e.g., a nonzero MoreWords field value), indicating to the RFID reader that the RFID IC has additional words stored in its memory.

In an optional step 1114, the RFID IC may receive a follow-up wireless command from the RFID reader. For example, after the RFID reader receives the response to the initial wireless command including the first data and the indication of an available amount of additional data, the RFID reader can first determine whether to retrieve the additional unrequested data. If the RFID reader decides to request the available additional data, the RFID reader may send, and the RFID IC may receive, a follow-up wireless command. The follow-up wireless command can be of similar structure to the initial wireless command but have different values. For example, the follow-up wireless command can use the indication of an available amount of additional data received as a response to the initial wireless command and request the additional data from the RFID IC. The follow-up wireless command may include an indication of a second memory location, where the additional data is stored, that is different than the memory location where the first data is stored. For an example where the wireless command is a modified read command of FIG. 10, and that the additional data is contiguous to the first data portion, the initial modified read command can include a first word pointer field value (WordPtr1) and a first word count field value (WordCount1). The RFID reader can send a follow-up modified read command including a second word pointer field value equal to WordPtr2=WordPtr1+WordCount1, and a word count field value equal to the indication of the available amount of additional data received in the response to the initial modified read command (i.e., WordCount2=MoreWords).

In an optional step 1116, the RFID IC may respond to the follow-up wireless command with the available additional data. The response may include performing the steps of 1104-1112, and may continue until the RFID reader decides to stop requesting data.

An example of an RFID reader retrieving data from the RFID tag is described for the modified read command of FIG. 10. In some embodiments, for example when the modified read command is a ReadVar of the Gen2 Protocol, the word pointer field may use extensible bit vectors (EBVs), as mentioned above, to point to a location in memory. EBVs may be structured as one or more n-bit blocks, each block containing a single extension bit (which is herein placed in brackets, [ ], for readability) followed by n-1 data bits. In the following example, EBVs with 8-bit blocks are used to implement word pointer field values. Initially, the RFID IC may store 400 words in a memory bank. The RFID reader may send a first modified read command to the RFID IC requesting the first 255 words from the memory bank of the RFID IC (i.e., ignoring the RN and CRC fields, Command1='11011000', MemBank1='11', WordPtr1='[0]0000000', WordCount1='11111111'). The RFID IC may receive the first modified read command and perform the steps described by 1104-1112 to send a response to the RFID reader including the first 255 words and an indication that 127 or more words are available in the memory bank of the RFID IC (i.e., NumWords1='11111111', MoreWords1='1111111', MemoryWords1='Word1, Word2, . . . , Word255'). After receiving the response to the first modified read command, the RFID reader can then choose to send a second modified read command to the RFID IC requesting the next 127 words (i.e., Command2='11011000', MemBank2='11', WordPtr2='[1]0000001[0]1111111', WordCount2='01111111'). The RFID IC can receive the second modified read command and repeat the steps described by 1104-1112 and send a response to the RFID reader including the next 127 words after the initial 255 and an indication that 18 more words are available in the memory bank of the RFID IC (i.e., NumWords2='01111111', MoreWords2='0010010', MemoryWords2='Word256, Word 257, . . . , Word382'). After receiving the response to the second modified read command, the RFID reader can then choose to send a third modified read command to the RFID IC requesting the remaining 18 words (i.e., Command3='11011000', MemBank3='11', WordPtr3='[1]0000010[0]0111111', WordCount3='00010010'). The RFID IC may receive the third modified read command and once again repeat the steps described by 1104-1112 and send a response to the RFID reader including the remaining 18 words (i.e., NumWords3='00010010', MoreWords3='0000000', MemoryWords3='Word383, Word384, . . . Word400'). After receiving the response to the third modified read command, the RFID reader may determine that no additional data are available and determine the retrieval of data from the RFID IC is complete.

The amount and order of steps of the method 1100 are not intended to present limitations on embodiments. The processes of method 1100 may be performed in different order, have fewer or additional steps, or make use different data structures while still employing the principles described herein.

According to some examples, a method for a radio frequency identification (RFID) integrated circuit (IC) to wirelessly send data may include receiving, from an RFID reader, a wireless command requesting first data from a memory bank of the RFID tag IC. The method may also include determining, by the RFID IC, whether the first data are available. The method may additionally include, upon determining that at least a portion of the first data is available, determining, by the RFID IC, whether additional data are also available from the memory bank. The method may further include, upon determining that the additional data are also available, responding to the wireless command by wirelessly sending the available first data portion combined with an indication of an available amount of the additional data, without receiving any intervening commands between sending the first data portion and the indication.

According to some other examples, the wireless command may instruct the RFID IC to respond with the first data combined with the indication. The wireless command may include a command code that instructs the RFID IC to respond with the first data combined with the indication. The indication of the amount of the additional data may include one of a value of the amount or indicate that the amount is greater than a maximum value. The RFID IC may, upon determining that the additional data are not also available from the memory bank, respond to the wireless command by one of: wirelessly sending the available first data portion without an additional data indication, or wirelessly sending the available first data portion combined with an indication that no additional data are available. The indication of the amount of additional data may include one of a value of the amount or indicate that the amount is greater than a maximum value. The wireless command may request the first data by requesting a first amount of the first data. The RFID IC may respond to the wireless command with a length of the available first data portion. The RFID IC may, upon determining that the first data are not available, respond to the wireless command by sending an error code. The additional data may be located contiguously after the first data in the memory bank. The wireless command may be a ReadVar command of the Gen2 Protocol.

According to other examples, a Radio Frequency Identification (RFID) integrated circuit (IC) may include a memory configured to store data and including one or more memory banks; a transceiver configured to receive commands and send replies; and a processing block coupled to the memory and the transceiver and configured to: receive, via the transceiver, a wireless command from an RFID reader requesting first data from a memory bank of the RFID tag IC; determine whether the first data are available; upon determining that at least a portion of the first data is available, determine whether additional data are also available from the memory bank; and upon determining that the additional data are also available, respond to the command by wirelessly sending, visa the transceiver, the available first data portion combined with an indication of an available amount of the additional data, without receiving any intervening commands between sending the first data portion and the indication.

According to yet other examples, the wireless command may instruct the RFID IC to respond with the first data combined with the indication. The processing block may be further configured to, upon determining that the additional data are not also available from the memory bank, respond to the wireless command by one of: wirelessly sending the available first data portion without an additional data indication, or wirelessly sending the available first data portion combined with an indication that no additional data are available. The indication of the amount of the additional data may include one of a value of the amount or indicates that the amount is greater than a maximum value. The wireless command may request the first data by requesting a first amount of the first data. The available first data portion may be less than the first amount. The processing block may be further configured to respond to the wireless command with a length of the available first data portion. The processing block may be yet further configured to, upon determining that the first data are not available, respond to the wireless command by wirelessly sending an error code. The wireless command may be a ReadVar command of the Gen2 Protocol.

According to further examples, a method for a Radio Frequency Identification (RFID) reader to wirelessly retrieve data from an RFID tag may include sending a wireless command requesting first data from a memory bank of the RFID tag. The method may also include receiving a response including at least a portion of the requested first data and an indication of an amount of additional, unrequested data in the memory bank. The method may further include based on the indication, determining whether to retrieve the additional, unrequested data.

According to yet further examples, the wireless command may instruct the RFID tag to respond with the requested first data combined with the indication of an available amount of additional data. Further, the wireless command may include a command code that instructs the RFID IC to respond with the first data combined with the indication. The indication of an amount of available amount of additional data may indicate one of: no additional data is available, a particular amount of additional data is available, or an amount of additional data greater than a maximum value is available. The wireless command may request a first amount of the first data. The response may include a portion of the requested first data that is less than the requested first amount of the first data. The response may include a length of the portion of requested first data. The response may include an indication of a location of the unrequested data in the memory bank. The additional data may be located contiguously after the first data in the memory bank. The wireless command may be a ReadVar command of the Gen2 Protocol.

According to additional examples, a Radio Frequency Identification (RFID) reader may include a transceiver configured to transmit commands and receive replies; a memory configured to store data; and a processing block coupled to the memory and the transceiver and configured to: transmit, via the transceiver, a command requesting first data from a memory bank of an RFID tag; receive a response including the requested first data and an indication of an amount of additional, unrequested data in the memory bank; and based on the indication, determine whether to retrieve the additional, unrequested data.

According to yet additional examples, the wireless command may instruct the RFID tag to respond with the requested first data combined with the indication of an available amount of additional data. Further, the wireless command may include a command code that instructs the RFID IC to respond with the first data combined with the indication. The indication of an amount of available amount of additional data may indicate one of: no additional data is available, a particular amount of additional data is available, or an amount of additional data greater than a maximum value is available. The wireless command may request a first amount of the first data. The response may include a portion of the requested first data that is less than the requested first amount of the first data. The response may include a length of the portion of requested first data. The response may include an indication of a location of the unrequested data in the memory bank. The additional data may be located contiguously after the first data in the memory bank. The wireless command may be a ReadVar command of the Gen2 Protocol. As mentioned previously, embodiments are directed to accessing data in an RFID tag memory bank. Embodiments additionally include programs, and methods of operation of the programs. A program is generally defined as a group of steps or operations leading to a desired result, due to the nature of the elements in the steps and their sequence. A program is usually advantageously implemented as a sequence of steps or operations for a processor, but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions, data, keys, signatures, and other data of a program made according to the embodiments. A storage medium according to the embodiments is a computer-readable medium, such as a memory, and is read by a processor of the type mentioned above. If a memory, it can be implemented in any of the ways and using any of the technologies described above.

Even though it is said that the program may be stored in a computer-readable medium, it should be clear to a person skilled in the art that it need not be a single memory, or even a single machine. Various portions, modules or features of it may reside in separate memories, or even separate machines.

The separate machines may be connected directly, or through a network such as a local access network (LAN) or a global network such as the Internet.

Often, for the sake of convenience only, it is desirable to implement and describe a program as software. The software can be unitary, or thought of in terms of various interconnected distinct software modules.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented individually and/or collectively, by a wide range of hardware, software, firmware, or virtually any combination thereof. Those skilled in the art will recognize that some aspects of the RFID embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A method for a radio frequency identification (RFID) integrated circuit (IC) to wirelessly send data, the method comprising:
   receiving, from an RFID reader, a wireless command requesting first data from a memory bank of the RFID IC;
   determining whether the first data are available;
   upon determining that at least a portion of the first data is available, determining whether additional data are also available from the memory bank; and
   upon determining that the additional data are also available, responding to the wireless command by wirelessly sending the available first data portion combined with an indication of an available amount of the additional data, without receiving any intervening commands between sending the first data portion and the indication.

2. The method of claim 1, wherein the wireless command instructs the RFID IC to respond with the first data combined with the indication.

3. The method of claim 2, wherein the wireless command includes a command code that instructs the RFID IC to respond with the first data combined with the indication.

4. The method of claim 1, further comprising, upon determining that the additional data are not also available from the memory bank, responding to the wireless command by one of:
   wirelessly sending the available first data portion without an additional data indication, or
   wirelessly sending the available first data portion combined with an indication that no additional data are available.

5. The method of claim 1, wherein the indication of the amount of the additional data includes a value of the amount of the additional data or indicates that the amount of the additional data is greater than a maximum value.

6. The method of claim 1, wherein the wireless command requests the first data by requesting a first amount of the first data.

7. The method of claim 6, wherein the available first data portion is less than the requested first amount.

8. The method of claim 1, further comprising:
   responding to the wireless command with a length of the available first data portion.

9. The method of claim 1, further comprising:
   upon determining that the first data are not available, responding to the wireless command by wirelessly sending an error code.

10. The method of claim 1, wherein the additional data are located contiguously after the first data in the memory bank.

11. The method of claim 1, wherein the wireless command is a ReadVar command of the Gen2 Protocol.

12. A Radio Frequency Identification (RFID) integrated circuit (IC) comprising:
   a memory configured to store data and including one or more memory banks;
   a transceiver configured to receive commands and send replies; and
   a processing block coupled to the memory and the transceiver and configured to:
      receive, via the transceiver, a wireless command from an RFID reader requesting first data from a memory bank of the RFID IC;
      determine whether the first data are available;
      upon determining that at least a portion of the first data is available, determine whether additional data are also available from the memory bank; and
      upon determining that the additional data are also available, respond to the command by wirelessly sending, visa the transceiver, the available first data portion combined with an indication of an available amount of the additional data, without receiving any intervening commands between sending the first data portion and the indication.

13. The RFID IC of claim 12, wherein the wireless command instructs the RFID IC to respond with the first data combined with the indication.

14. The RFID IC of claim 12, wherein the processing block is further configured to, upon determining that the additional data are not also available from the memory bank, respond to the wireless command by one of:

wirelessly sending the available first data portion without an additional data indication, or wirelessly sending the available first data portion combined with an indication that no additional data are available.

15. The RFID IC of claim 12, wherein the indication of the amount of the additional data includes a value of the amount of the additional data or indicates that the amount of the additional data is greater than a maximum value.

16. The RFID IC of claim 12, wherein the wireless command requests the first data by requesting a first amount of the first data.

17. The RFID IC of claim 16, wherein the available first data portion is less than the requested first amount.

18. The RFID IC of claim 12, wherein the processing block is further configured to:

respond to the wireless command with a length of the available first data portion.

19. The RFID IC of claim 12, wherein the processing block is further configured to:

upon determining that the first data are not available, respond to the wireless command by wirelessly sending an error code.

20. The RFID IC of claim 12, wherein the wireless command is a ReadVar command of the Gen2 Protocol.

* * * * *